United States Patent [19]

Koht et al.

[11] Patent Number: 4,692,565
[45] Date of Patent: Sep. 8, 1987

[54] SEGMENTED END SEAL AND CLOSURE

[75] Inventors: Lowell Koht, Cary; Gerald L. Shimirak, Fuquay-Varina, both of N.C.

[73] Assignee: Raychem Corporation, Menlo Park, Calif.

[21] Appl. No.: 826,716

[22] Filed: Feb. 6, 1986

[51] Int. Cl.[4] .......................................... H02G 15/113
[52] U.S. Cl. ................... 174/93; 174/77 R; 174/92
[58] Field of Search .................. 174/77 R, 92, 93; 277/192, 199

[56] References Cited

U.S. PATENT DOCUMENTS

| | | | |
|---|---|---|---|
| 1,606,789 | 11/1926 | Hooley | 174/93 |
| 2,881,241 | 4/1959 | Stecher | 174/77 R |
| 3,260,794 | 7/1966 | Kohler | 174/93 |
| 3,624,594 | 11/1971 | Trimble | 174/93 |
| 3,796,823 | 3/1974 | Wright et al. | 174/77 R X |
| 3,984,623 | 10/1976 | Worden | 174/93 X |
| 4,015,072 | 3/1977 | Gillemot | 174/92 |
| 4,103,911 | 8/1978 | Giebel et al. | 174/77 R X |
| 4,117,259 | 9/1978 | Giebel et al. | 174/92 |
| 4,341,922 | 7/1982 | Bossard et al. | 174/92 |
| 4,421,945 | 12/1983 | Moisson | 174/92 |
| 4,538,021 | 8/1985 | Williamson, Jr. | 174/92 |

FOREIGN PATENT DOCUMENTS

| | | | |
|---|---|---|---|
| 2319956 | 11/1974 | Fed. Rep. of Germany | 174/92 |
| 3025766 | 1/1982 | Fed. Rep. of Germany | 174/92 |

Primary Examiner—Morris H. Nimmo
Attorney, Agent, or Firm—Ira D. Blecker

[57] ABSTRACT

A closure which consists of a closure body having two segmented end seals. Each of these segmented end seals consists of a support structure and at least two pie-shaped end sections. The end sections are sized and configured for mating with the support structure. Each of the end sections has a portion of its periphery which comprises a segment of the periphery of the assembled segmented end seal so that when the end sections and the support structure are mated together the assembled segmented end seal has a uniform periphery. At least one of the pie-shaped end sections contains an aperture for receiving a cable wherein the aperture is located entirely within the periphery of the section.

18 Claims, 6 Drawing Figures

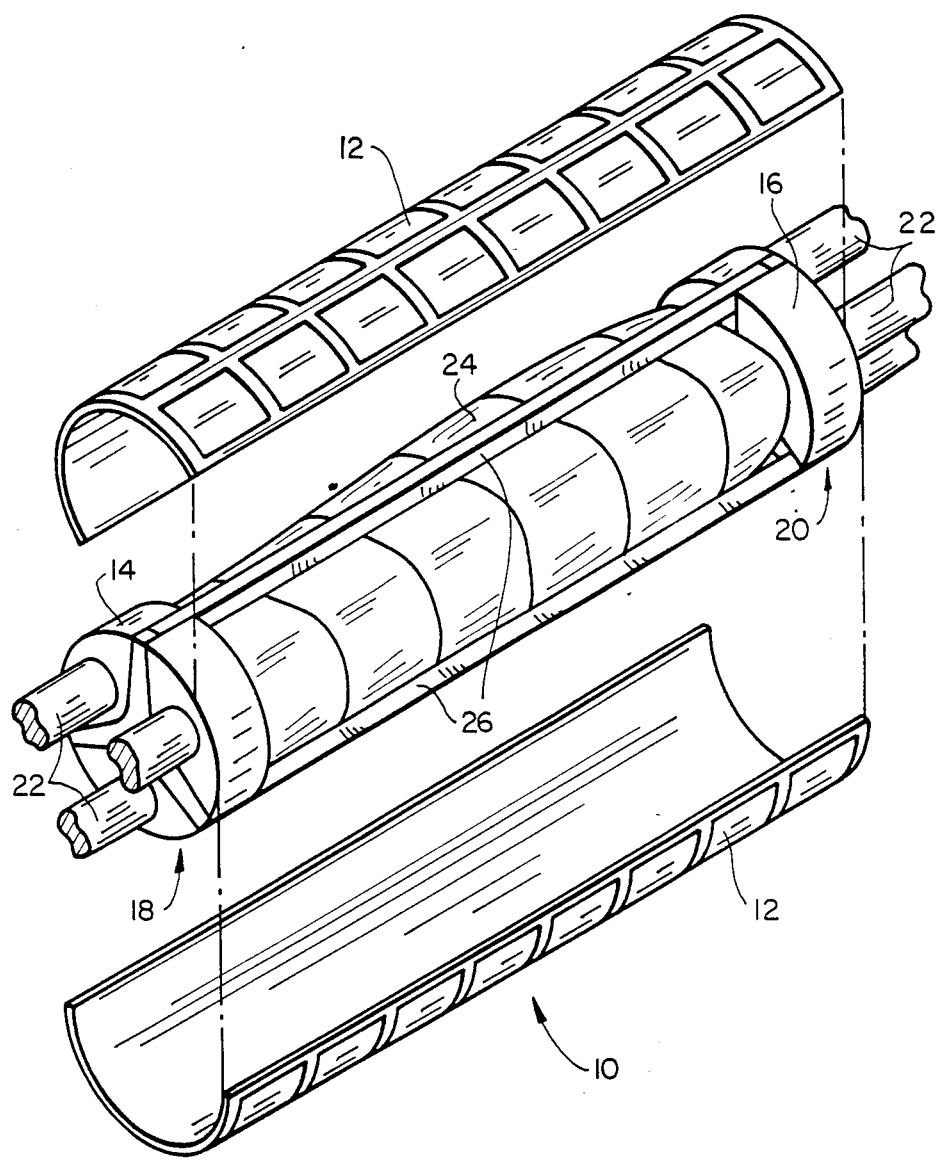
FIG_1

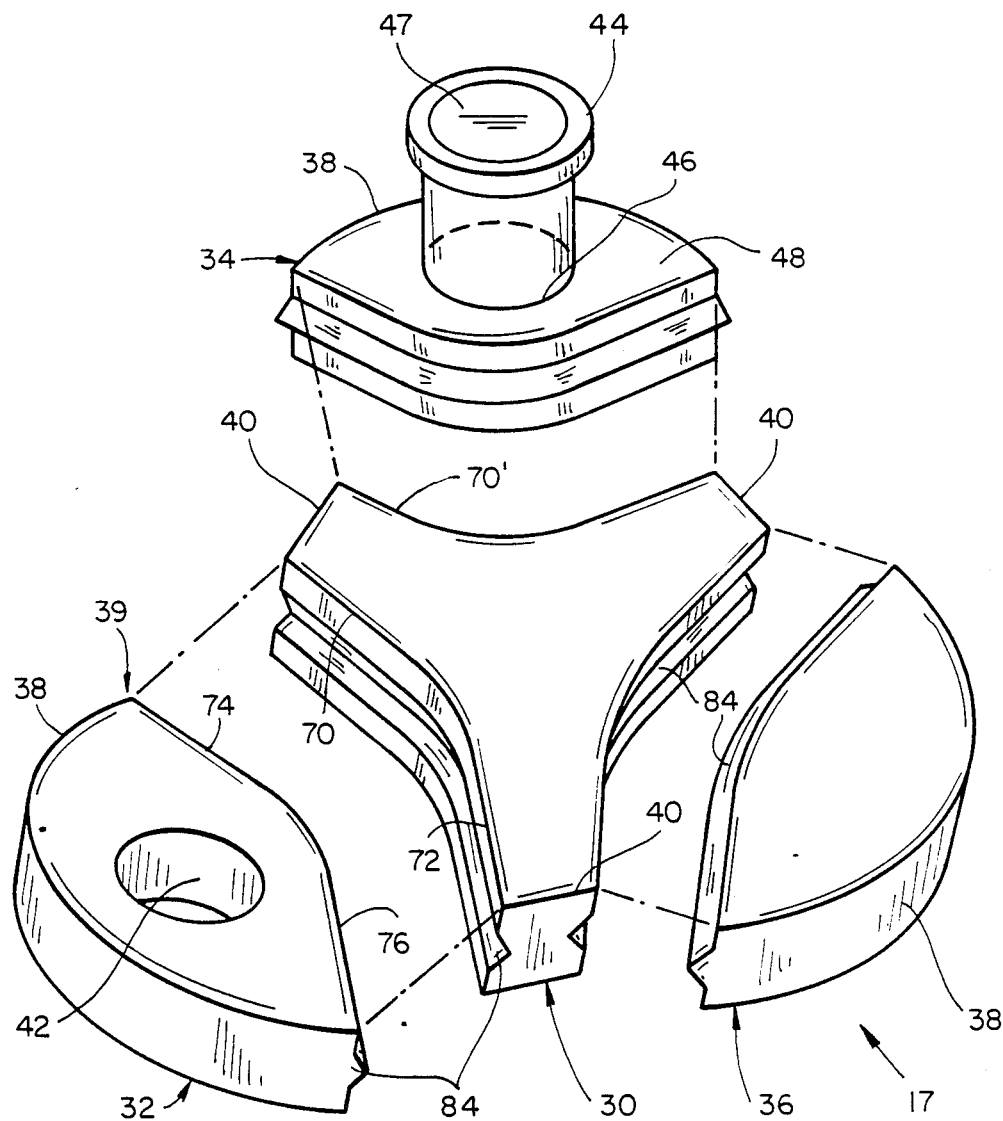
FIG_2

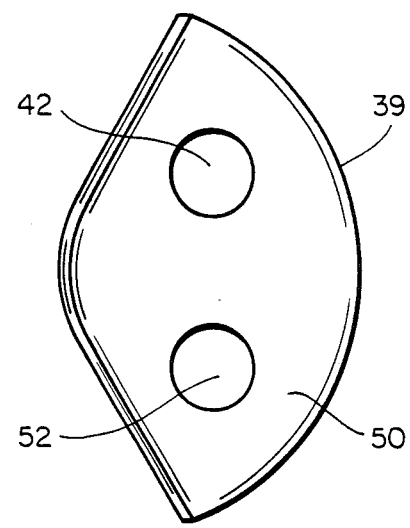
FIG_3
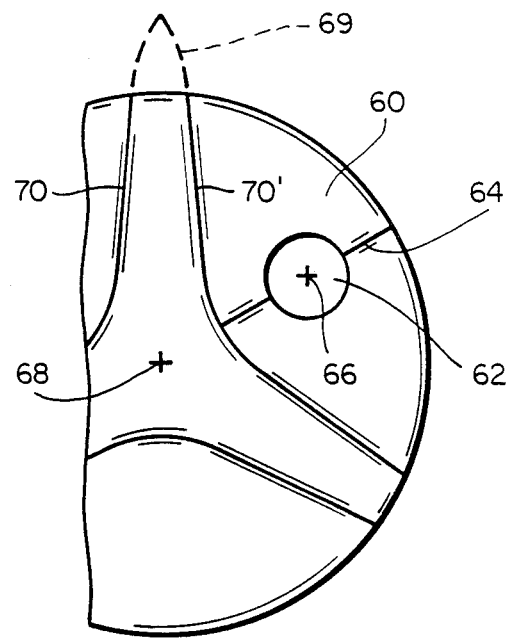
FIG_4

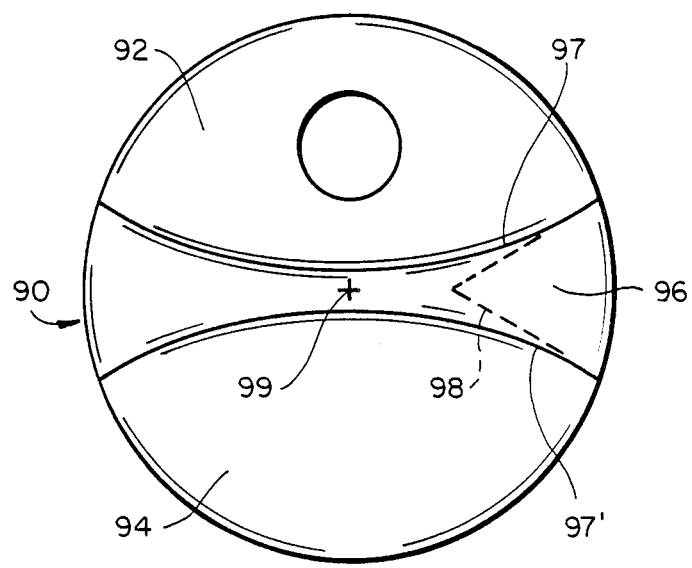
FIG_5
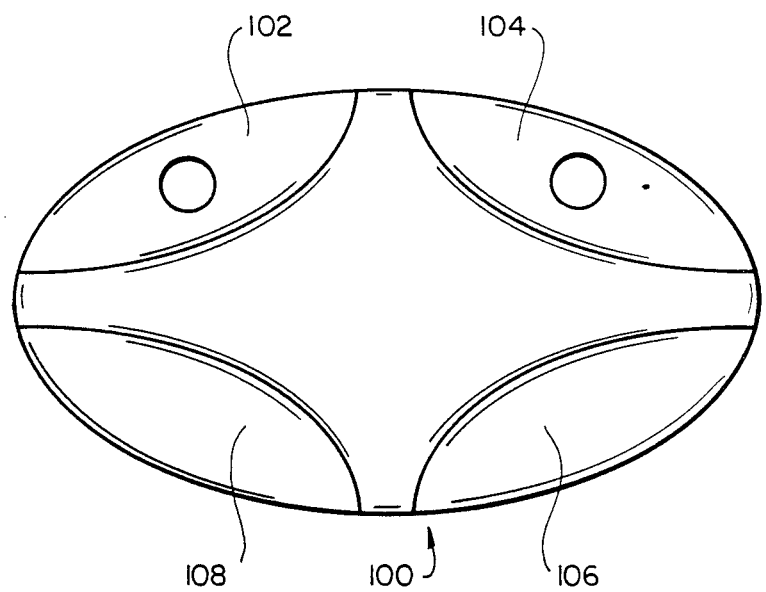
FIG_6

4,692,565

SEGMENTED END SEAL AND CLOSURE

BACKGROUND OF THE INVENTION

The present invention relates to a cable closure for housing junctions of cables and more particularly relates to a cable closure having a seal for sealing the ends of the cable closure.

It is frequently necessary to insulate and protect junctions in cables, for example electrical cables. In effecting junctions between electrical cables, for example telephone or power cables, on site, many problems arise in meeting the necessary requirements of continuity of insulation and earthing, of rendering the joint waterproof and proof against chemical attack, of mechanical strength, resistance to pull-out of the cables under tension and resistance to compression, flexing and impact. The means for protecting the junction normally has to provide mechanical protection, give overall electrical insulation, prevent ingress of water and other contaminants and, when the cable is a pressurized cable, be pressure-tight.

There have been proposed a variety of different designs and configurations for providing the protection required, many of which are satisfactory. However, all of them suffer from the disadvantage that adding or removing a cable is cumbersome and time-consuming. A further disadvantage of these designs and configurations is that changing the size of an existing cable is equally cumbersome and time-consuming.

Thus, it would be desirable to have a more versatile cable closure.

A number of closures have been proposed in which the end caps or seals are segmented and have various size apertures for receiving cables of correspondingly various sizes. Among these are Worden U.S. Pat. No. 3,984,623; Gillemot U.S. Pat. No. 4,015,072; Giebel et al U.S. Pat. No. 4,103,911; Giebel et al U.S. Pat. No. 4,117,259; Bossard et al U.S. Pat. No. 4,341,922; and Moisson U.S. Pat. No. 4,421,945. All of these suffer from a lack of versatility. For example, if one were to add a cable of the same or a different size, one would have to change the end seal. Or, if one were to delete a cable, then the aperture would have to be plugged (usually unsatisfactory for a fluid tight seal) or the end seal would have to be changed. Since changing an end seal requires disturbing the cable junction, it can be appreciated that such an operation is to be avoided if at all possible.

Accordingly, it is an object of the invention to have an end seal and cable closure that is versatile in operation.

It is another object of the invention to have an end seal and cable closure such that adding a cable of the same or a different size or deleting a cable can be accomplished without disturbing the cable junction.

It is a further object of the invention to have an end seal and cable closure such that adding a cable of the same or a different size or deleting a cable can be accomplished quickly and easily.

These and other objects of the invention will become apparent after reference to the following description considered in conjunction with the accompanying drawings.

BRIEF SUMMARY OF THE INVENTION

There is disclosed according to the invention a closure comprising a closure body having at least one segmented end seal wherein the segmented end seal comprises a support structure and at least two pie-shaped end sections. The pie-shaped end sections are sized and configured for mating with a support structure. Each of the pie-shaped end sections has a portion of its periphery which comprises a segment of the periphery of the assembled segmented end seal so that when the pie-shaped end sections and the support structure are mated together the assembled segmented end seal has a uniform periphery. At least one of the pieshaped end sections contains an aperture for receiving a cable. The aperture is located entirely within the periphery of the pie-shaped end section.

Thus, when it is desired to add or change one of the cables it is necessary only to change one of the pie-shaped end sections without disturbing the rest of the cable junction. In this manner the objects of the invention are most easily achieved.

BRIEF DESCRIPTION OF THE DRAWINGS

FIG. 1 is a perspective view of the closure according to the invention with the closure body removed.

FIG. 2 is an exploded perspective view of the segmented end seal according to the invention.

FIG. 3 is a top view of an alternative embodiment of a pie-shaped end section according to the invention.

FIG. 4 is a partial top view of the assembled segmented end seal showing another embodiment of a pie-shaped end section according to the invention.

FIG. 5 is a top view of another embodiment of the assembled segmented end seal according to the invention.

FIG. 6 is a top view of still another embodiment of the assembled segmented end seal according to the invention.

DETAIL DESCRIPTION OF THE INVENTION

According to the invention there is disclosed a closure comprising a closure body having at least one segmented end seal. The segmented end seal comprises a support structure and at least two pie-shaped end sections sized and configured for mating with the support structure. Each of the pie-shaped end sections has a portion of its periphery which comprises a segment of the periphery of the assembled segmented end seal so that when the pie-shaped end sections and the support structure are mated together the assembled segmented end seal has a uniform periphery. At least one of the pie-shaped end sections contains an aperture for receiving a cable wherein the aperture is located entirely within the periphery of the pie-shaped end section.

Referring to the figures in more detail and particularly referring to FIG. 1 there is shown a perspective view of a closure 10 according to the invention. In this view the closure body 12 is broken away so that the interior of the closure can be seen. In FIG. 1 there is shown a pair of segmented end seals 14, 16 one on each end 18, 20 of the closure 10 with cables 22 protruding therefrom. Within the closure there is a splice junction 24 which is environmentally protected by some means such as by a wraparound sleeve. Additionally, there are shown support bars 26 which serve the dual purpose of spacing apart the segmented end seals 14, 16 the proper distance as well as providing for the closure. The details of assembling and sealing a closure such as that shown in FIG. 1 are well known to those skilled in the art. In this regard, reference may be made to, for example, Williamson, Jr., U.S. Pat. No. 4,538,021.

Normally, there will be two segmented end seals as shown in FIG. 1. However, under certain circumstances, there may be required only one segmented end seal and the other end of the closure may be permanently sealed.

The segmented end seal can be appreciated better when viewed as in FIG. 2. In this figure there is shown a perspective exploded view of a segmented end seal 17 similar to the segmented end seals 14, 16 shown in FIG. 1. As can be seen there is a support structure 30 and three generally pie-shaped end sections 32, 34, 36 which are sized and configured for mating with the support structure. Each of the pie-shaped end sections has a portion 38 of its periphery, indicated generally by 39, which comprises a segment of the periphery of the assembled segmented end seal so that when the pie-shaped end sections and the support structure are mated together, as can be seen for example in FIG. 1, the segmented end seal has a uniform periphery. In other words, the sum of the peripheral portions 38 substantially make up the periphery of the assembled segmented end seal. The support structure 30 will usually also have a peripheral portion or portions 40 which will contribute to the periphery of the assembled segmented end seal. At least one of the pie-shaped end sections contains an aperture 42 for receiving a cable wherein the aperture is located entirely within the periphery of the pie-shaped end section.

As shown in FIG. 2 there are two such sections 32, 34 which contain an aperture. To achieve the objects of the invention, however, there need only be one such section having an aperture.

While FIG. 2 shows an embodiment in which there are three pie-shaped end sections, it is within the scope of the invention for a segmented end seal 90 to have only two pie-shaped end sections 92, 94 as illustrated in FIG. 5. Of course, this would require suitable configuring of the support structure. Similarly, a segmented end seal 100 may contain more than three pie-shaped end sections such as the four end sections 102, 104, 106, 108 illustrated in FIG. 6. Of course, the support structure would again require suitable modification to accommodate the additional number of pie-shaped end sections. In a similar manner, the segmented end seal may be designed to accommodate more than four end sections. Such design is readily accomplished by those skilled in the art with the teaching described herein.

It is within the scope of the invention for the segmented end seal to be circular in appearance, as illustrated for example in FIGS. 1 and 5, or oval, as illustrated in FIG. 6. While not shown, the segmented end seal may also be rectangular or any other polygonal shape which may be desired. However, it is preferred that the shape be circular.

Each of the segmented end seals 14, 16 need not be identical. That is, one segmented end seal may have three pie-shaped end sections while the other segmented end seal may only have two pie-shaped end sections. Similarly, one segmented end seal may have two apertures while the other segmented end seal may have three apertures. The only requirement is that they have the same total configuration and shape, whether it be circular, oval, square, etc.

The closure body may be any of several types of closure bodies which are well known to those skilled in the art. Thus for example the closure body may consist of a wraparound heat shrinkable closure body or it may consist of a mechanical closure body as illustrated in FIG. 1. Such closure bodies are familar to those skilled in the art and thus it is not necessary to go into their details at this time.

The segmented end seals may be made from any engineering thermoplastic, thermoset or metallic material.

It is contemplated within the scope of the invention that while the segmented end seal is to be used with the closure body, the segmented end seal may be provided separately from the closure body as a separate article of commerce. Accordingly, segmented end seals in and of themselves are within the scope of the invention.

As shown in FIG. 2 there are three separate embodiments of the pie-shaped end sections. Thus there is the pie-shaped end section 32 having an aperture 42 entirely within its periphery as discussed earlier. There is also a pie-shaped end section 34 having an aperture entirely within its periphery and which also includes a tubular member 44 aligned with the aperture 46 and projecting from a surface 48 of the pie-shaped end section. Such a tubular member 44 would be provided, for example, when strain relief of the exiting cable is necessary. The tubular member 44 may be provided sealed by some means 47, such as a plug, until the aperture 46 is ready to be used. Additionally, shown in FIG. 2 is a pie-shaped end section 36 which is solid. Such a solid section would be provided when, for example, it is desired to delete one of the existing cables.

Referring now to FIGS. 3 and 4 there are illustrated further embodiments of the pie-shaped end sections. In FIG. 3 there is shown a pie-shaped end section 50 which contains at least one other aperture 52 in addition to aperture 42 which is located entirely within the periphery 39 of the pie-shaped end section. Thus, in this embodiment of the pie-shaped end section there will be two or more apertures depending of course on the circumstance and the size of the cables. In FIG. 4 there is shown a pie-shaped end section 60 in which the section and aperture 62 are split 64. It is preferred that the split 64 proceed through the center 66 of the aperture 62 as shown in FIG. 4. It is further preferred, to achieve the optimum sealing, that the split proceed radially outwardly from the center 68 of the support structure through the center 66 of the split aperture. However, it is also contemplated within the scope of the invention that the split may proceed in a non radial direction.

It can be appreciated that such a segmented end seal according to the invention has many advantages. For example, when deleting a cable from the junction shown in FIG. 1 all that need be done is to snip off the end of the cable, remove the pie-shaped section containing the aperture, for example section 32, and insert a section which is solid such as section 36. A similar operation would take place at the opposite segmented end seal. If it was necessary to add a cable, the reverse would occur. That is, the solid end section 36 would be removed from each segmented end seal 14, 16 and then an end section would be added having an aperture such as section 32. Of course, such an operation would not necessitate the opening of the junction 24 but even if this were to occur the other cable splices would not need to be disturbed since the entire end seal would not need to be replaced. If it were necessary to add smaller cables, then the end section 50 shown in FIG. 3 may be substituted for one of the other pie-shaped end sections. On the other hand, if a cable were to be added which could not be cut or spliced, then it would be necessary to use the split pie-shaped end section 60 shown in FIG. 4. By now it should be appreciated that cables may be changed, added or deleted without unduly disturbing the spliced junction 24. Accordingly, the objects of the invention have been achieved with a segmented end seal which is extremely versatile.

An additional advantage of the invention not mentioned previously is that electronic sensing equipment, such as an alarm or a transducer, may be incorporated into one of the pie-shaped end sections.

Such closures as disclosed according to the invention are useable in a wide variety of applications. Thus the closure may be pressurized or non-pressurized. The end closure may also be used for telephone, power or CATV applications. Further, the end closure may be used for copper or fiber optic cables. There are other uses and applications of the closure according to the invention which are not specifically enumerated here but which are nevertheless encompassed within the scope of the invention.

It is very important to the invention that the segmented end seal seal properly. In this regard the support structure 30 is provided with first 70 and second 72 surfaces for abutting with complementary first 74 and second 76 surfaces, respectively, of each of the end sections as illustrated in FIG. 2. It has been found that the best sealing is obtained when opposed surfaces 70, 70' of the support structure are not parallel. This is most clearly seen in FIG. 4 where surfaces 70, 70' diverge, as indicated by dotted lines 69, away from one another. In most embodiments of the invention, the divergence will be in the direction of the center 68 of the support structure. However, in the embodiment of FIG. 5, the two opposed surfaces 97, 97' will diverge 98 away from the center 99 of the support structure. When the opposed surfaces are provided as indicated, the forces which hold the segmented end seals together are transmitted to all the mating surfaces so as to provide the most effective seal. It is anticipated that the closure body will surround the segmented end seal so as to hold the various portions of the segmented end seal together. However, it is within the scope of the invention (although not shown) for there to be additional means to hold the various portions of the segmented end seal together for ease of assembly.

It is most preferred and it has been found that the most effective sealing occurs when the first 70 and second 72 surfaces of the support structure as well as the first 74 and second 76 surfaces of the end sections appear V-shaped 84 when viewed from the end can be seen in FIG. 2. Of course, the V-shape of the first and second surfaces of the support structure would be complementary to the V-shaped first and second surfaces of each respective end section so as to provide proper mating.

To further assist in sealing, sealing material may be placed around the circumference of the segmented end seal as well as between the mating surfaces of the support structure and each pie-shaped end section. Such sealing material may include, for purposes of illustration and not of limitation, gels, mastic and hot melt adhesives which are well known to those skilled in the art.

It will be apparent to those skilled in the art having regard to this disclosure that other modifications of this invention beyond those embodiments specifically described here may be made without departing from the spirit of the invention. Accordingly, such modifications are considered within the scope of the invention as limited solely by the appended claims.

We claim:

1. A segmented end seal comprising:
   a support structure comprising a central solid portion and a plurality of legs emanating from the central portion wherein the distal end of each of the legs comprises a segment of the periphery of the assembled segmented end seal;
   at least two pie shaped end sections sized and configured for mating with said support structure in that each leg of said support structure has a first surface and an adjacent leg has a second surface for abutting complementary first and second surfaces, respectively, of each of said end sections, each of said sections having a portion of its periphery which comprises a segment of the periphery of the assembled segmented end seal so that when said sections and said support structure are mated together, said assembled segmented end seal has a uniform periphery,
   wherein at least one of said sections contains an aperture for receiving a cable, the aperture being located entirely within the periphery of said section; and
   wherein the assembled segmented end seal is configured such that:
   (a) the central portion of said support structure is positioned so as to be the center of said end seal;
   (b) each pie shaped end section may be removed without disturbing any other end section; and
   (c) each pie shaped end section is seated in said support structure by the first and second surfaces of said support structure.

2. The segmented end seal of claim 1 wherein at least one of said sections is solid.

3. The segmented end seal of claim 1 wherein at least one of said sections containing an aperture contains at least one other aperture which is located entirely within the periphery of said section.

4. The segmented end seal of claim 1 wherein at least one of said sections containing an aperture is entirely split through the aperture.

5. The segmented end seal of claim 4 wherein said split section is split in such a manner that when mated with said support structure, said split section is split in a radial direction.

6. The segmented end seal of claim 1 wherein at least one of said sections containing an aperture includes a tubular member aligned with the aperture and projecting from a surface of said section.

7. The segmented end seal of claim 6 wherein one end of said tubular member is sealed.

8. The segmented end seal of claim 1 wherein said support structure has opposed surfaces which are not parallel.

9. The segmented end seal of claim 1 wherein the first and second surfaces of said support structure and said sections appear V-shaped when viewed in cross-section.

10. A closure comprising
    a closure body having at least one segmented end seal wherein said segmented end seal comprises:
    a support structure comprising a central solid portion and a plurality of legs emanating from the central portion; wherein the distal end of each of the legs comprises a segment of the periphery of the assembled segmented end seal;

at least two pie shaped end sections sized and configured for mating with said support structure in that each leg of said support structure has a first surface and an adjacent leg has a second surface for abutting complementary first and second surfaces, respectively, of each of said end sections, each of said sections having a portion of its periphery which comprises a segment of the periphery of the assembled segmented end seal so that when said sections and said support structure are mated together, said assembled segmented end seal has a uniform periphery;

wherein at least one of said sections contains an aperture for receiving a cable, the aperture being located entirely within the periphery of said section; and wherein the assembled segmented end seal is configured such that:
 (a) the central portion of said support structure is positioned so as to be the center of said end seal;
 (b) each pie shaped end section may be removed without disturbing any other end section; and
 (c) each pie shaped end section is seated in said support structure by the first and second surfaces of said support structure.

11. The closure of claim 10 wherein at least one of said end sections is solid.

12. The closure of claim 10 wherein at least one of said end sections containing an aperture contains at least one other aperture which is located entirely within the periphery of said section.

13. The closure of claim 10 wherein at least one of said end sections containing an aperture is entirely split through the aperture.

14. The closure of claim 13 wherein said split section is split in such a manner that when mated with said support structure, said split section is split in a radial direction.

15. The closure of claim 10 wherein at least one of said end sections containing an aperture includes a tubular member aligned with the aperture and projecting from a surface of said section.

16. The closure of claim 15 wherein one end of said tubular member is sealed.

17. The closure of claim 10 wherein said support structure has opposed surfaces which are not parallel.

18. The closure of claim 10 wherein the first and second surfaces of said support structure and said sections appear V-shaped when viewed in cross-section.

* * * * *

REEXAMINATION CERTIFICATE (2669th)

United States Patent [19]
Koht et al.

[11] B1 4,692,565
[45] Certificate Issued Sep. 12, 1995

[54] SEGMENTED END SEAL AND CLOSURE

[75] Inventors: Lowell Koht, Cary; Gerald L. Shimirak, Fuquay-Varina, both of N.C.

[73] Assignee: Raychem Corporation, Menlo Park, Calif.

Reexamination Request:
No. 90/002,872, Oct. 28, 1992

Reexamination Certificate for:
Patent No.: 4,692,565
Issued: Sep. 8, 1987
Appl. No.: 826,716
Filed: Feb. 6, 1986

[51] Int. Cl.⁶ .................................. H02G 15/113
[52] U.S. Cl. ........................... 174/93; 174/77 R; 174/92
[58] Field of Search .............. 174/77 R, , 92, 93; 277/192, 199

[56] References Cited

U.S. PATENT DOCUMENTS

| | | | |
|---|---|---|---|
| 2,771,502 | 11/1956 | King et al. | 174/92 |
| 4,421,945 | 12/1983 | Moisson | 174/92 |

FOREIGN PATENT DOCUMENTS

| | | | |
|---|---|---|---|
| 2319956 | 11/1974 | Germany | 174/92 |
| 3025766 | 1/1982 | Germany | 174/92 |

*Primary Examiner*—Bot Ledynh

[57] ABSTRACT

A closure which consists of a closure body having two segmented end seals. Each of these segmented end seals consists of a support structure and at least two pie-shaped end sections. The end sections are sized and configured for mating with the support structure. Each of the end sections has a portion of its periphery which comprises a segment of the periphery of the assembled segmented end seal so that when the end sections and the support structure are mated together the assembled segmented end seal has a uniform periphery. At least one of the pie-shaped end sections contains an aperture for receiving a cable wherein the aperture is located entirely within the periphery of the section.

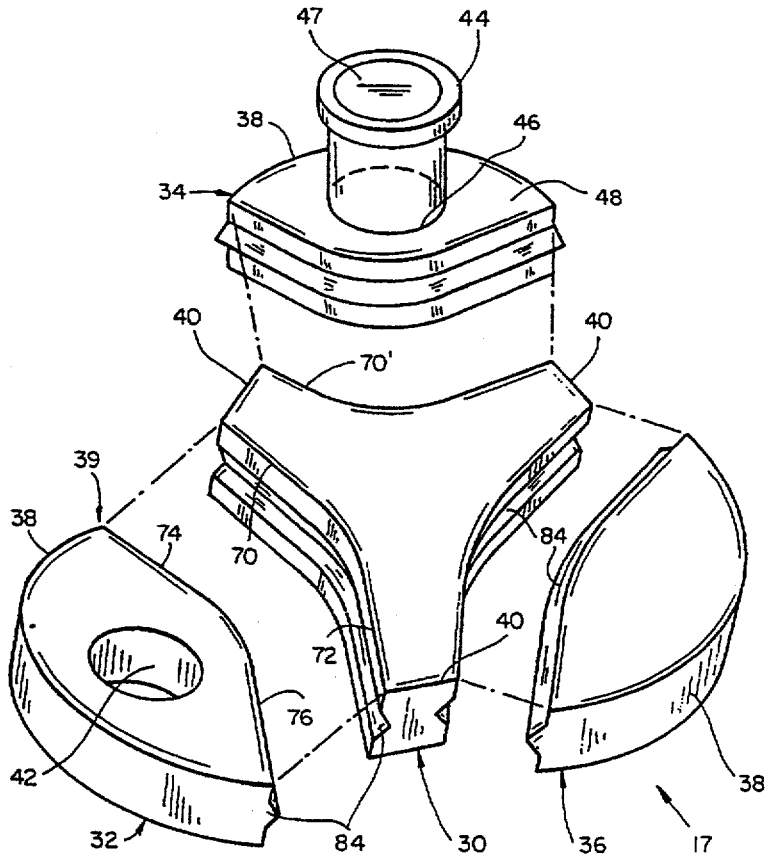

2

REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

Claims 1 and 10 are determined to be patentable as amended.

Claims 2-9 and 11-18, dependent on an amended claim, are determined to be patentable.

New claims 19-104 are added and determined to be patentable.

1. A segmented end seal comprising:
   a support structure comprising a central solid portion, and [a plurality of] *at least 3* legs emanating from the central portion wherein the distal end of each of the legs comprises a segment of the periphery of the assembled segmented end seal, *and wherein the distal ends of each of said legs are tapered downward from the central solid portion;*
   at least two pie shaped end sections sized and configured for mating with said support structure in that each leg of support structure has a first surface and an adjacent leg has a second surface for abutting complementary first and second surfaces, respectively, of each of said end sections, each of said sections having a portion of its periphery which comprises a segment of the periphery of the assembled segmented end seal so that when said sections and said support structure are mated together, said assembled segmented end seal has a uniform periphery,
   wherein at least one of said sections contains an aperture for receiving a cable, the aperture being located entirely within the periphery of said section; and
   wherein the assembled segmented end seal is configured such that:
   (a) the central portion of said support structure is positioned so as to be the center of said end seal;
   (b) each pie shaped end section may be removed without disturbing any other end section; and
   (c) each pie shaped end section is seated in said support structure by the first and second surfaces of said support structure.

10. A closure comprising:
    a closure body having at least one segmented end seal wherein said segmented end seal comprises:
    a support structure comprising a central solid portion and [a plurality of] *at least three* legs emanating from the central portion; wherein the distal end of each of the legs comprises a segment of the periphery of the assembled segmented end seal, *and wherein the distal ends of each of said legs are tapered downward from the central solid portion;*
    at least two pie shaped end sections sized and configured for mating with said support structure in that each leg of said support structure has a first surface and an adjacent leg has a second surface for abutting complementary first and second surfaces, respectively, of each of said end sections, each of said sections having a portion of its periphery which comprises a segment of the periphery of the assembled segmented end seal so that when said sections and said support structure are mated together, said assembled segmented end seal has a uniform periphery;
    wherein at least one of said sections contains an aperture for receiving a cable, the aperture being located entirely within the periphery of said section; and
    wherein the assembled segmented end seal is configured such that:
    (a) the central portion of said support structure is positioned so as to be the center of said end seal;
    (b) each pie shaped end section may be removed without disturbing any other end section; and
    (c) each pie shaped end section is seated in said support structure by the first and second surfaces of said support structure.

*19. A segmented end seal comprising:*
   *a support structure comprising a central solid portion and a plurality of legs emanating from the central portion wherein the distal end of each of the legs comprises a segment of the periphery of the assembled segmented end seal;*
   *at least two pie shaped end sections sized and configured for mating with said support structure in that each leg of support structure has a first surface and an adjacent leg has a second surface for abuting complementary first and second surfaces, respectively, of each of said end sections, each of said sections having a portion of its periphery which comprises a segment of the periphery of the assembled segmented end seal so that when said sections and said support structure are mated together, said assembled segmented end seal has a uniform periphery,*
   *wherein at least one of said sections contains an aperture for receiving a cable, the aperture being located entirely within the periphery of said section, and wherein at least one of said sections containing an aperture includes a tubular member aligned with the aperture and projecting from a surface of said section; and*
   *wherein the assembled segmented end seal is configured such that:*
   *(a) the central portion of said support structure is positioned so as to be the center of said end seal;*
   *(b) each pie shaped end section may be removed without disturbing any other end section; and*
   *(c) each pie shaped end section is seated in said support structure by the first and second surfaces of said support structure.*

*20. The segmented end seal of claim 19 wherein at least one of said sections is solid.*

*21. The segmented end seal of claim 19 wherein at least one of said sections containing an aperture contains at least one other aperture which is located entirely within the periphery of said section.*

*22. The segmented end seal of claim 19 wherein at least one of said sections containing an aperture is entirely split through the aperture.*

*23. The segmented end seal of claim 22 wherein said split section is split in such a manner that when mated with* said support structure, said spit section is split in a radial direction.

24. The segmented end seal of claim 19 wherein at least one end of said tubular member is sealed.

25. The segmented end seal of claim 19 wherein in said support structure has opposed surfaces which are not parallel.

26. The segmented end seal of claim 19 wherein the first and second surfaces of said support structure and said sections appear V-shaped when viewed in cross-section.

27. The segmented end seal of claim 24 wherein at least one of said sections is solid.

28. The segmented end seal of claim 24 wherein at least one of said sections containing a aperture contains at least one other aperture which is located entirely within the periphery of said section.

29. The segmented end seal of claim 24 wherein at least one of said sections containing an aperture is entirely split through the aperture.

30. The segmented end seal of claim 29 wherein said split section is split in such a manner that when mated with said support structure, said split section is split in a radial direction.

31. The segmented end seal of claim 24 wherein said support structure has opposed surfaces which are not parallel.

32. The segmented end seal of claim 24 wherein the first and second surfaces of said support structure and said sections appear V-shaped when viewed in cross section.

33. A segmented end seal comprising:
  a support structure comprising a central solid portion and a plurality of legs emanating from the central portion wherein the distal end of each of the legs comprises a segment of the periphery of the assembled segmented end seal;
  at least two pie shaped end sections sized and configures for mating with said support structure in that each of said support structure has a first surface and an adjacent leg has a second surface for abutting complimentary first and second surfaces, respectively, of each of said end sections, each of said section having a portion of its periphery which comprises a segment of the periphery of the assembled segmented end seal so that when said sections and said support structure are mated together, said assembled segmented end seal has a uniform periphery,
  wherein the first and second surfaces of said support structure and said sections appear V-shaped when viewed in cross section,
  wherein at least one of said sections contains an aperture for receiving a cable, the aperture being located entirely within the periphery of said section; and
  wherein the assembled segmented end seal is configures such that:
    (a) the central portion of said support structure is positioned so as to be the center of said end seal;
    (b) each pie shaped end section may be removed and without disturbing any other end section; and
    (c) each pie shaped end section is seated in said support structure by the first and second surfaces of said support structure.

34. The segmented end seal of claim 33 wherein at least one of said section is solid.

35. The segmented end seal of claim 33 wherein at least one of said sections containing an aperture contains at least one other aperture which is located entirely within the periphery of the section.

36. The segmented end seal of claim 33 wherein at least one of said sections containing an aperture is entirely split through the aperture.

37. The segmented end seal of claim 36 wherein said split section is split in such a manner that when mated with said support structure, said split section is split in a radial direction.

38. The segmented end seal of claim 33 wherein said support structure has opposed surfaces which are not parallel.

39. A closure comprising:
  a closure body having at least one segmented end seal wherein said segmented end seal comprises:
  a support structure comprising central solid portion and a plurality of legs emanating from the central portion, wherein the distal end of each of the legs comprises a segment of the periphery of the assembled segmented end seal;
  at least two pie shaped end sections sized and configured for mating with said support structure in that each leg of said support structure has a first surface and an adjacent leg has a second surface for abutting complementary first and second surfaces, respectively, of each of said end sections, each of said sections having a portion of its periphery which comprises a segment of the periphery of the assembled segmented end seal so that when said section and said support structure are mated together, said assembled segmented end seal has a uniform periphery;
  wherein at least one of said sections contains an aperture for receiving a cable, the aperture being located entirely within the periphery of said section, and wherein at least one of said end sections containing an aperture includes a tubular member aligned with the aperture and projecting from a surface of said section; and
  wherein the assembled segmented end seal is configured such that;
    (a) the central portion of said support structure is positioned so as to be the center of said end seal;
    (b) each pie shaped end section may be removed without disturbing any other end section; and
    (c) each pie shaped end section is seated in said support structure by the first and second surfaces of said support structure.

40. The closure of claim 39 wherein at least one said end sections is solid.

41. The closure of claim 39 wherein at least one of said end sections containing an aperture contains at least one other aperture which is located entirely within the periphery of the section.

42. The closure of claim 39 wherein at least one of said end sections containing an aperture is entirely split through the structure.

43. The closure of claim 42 wherein said split section is split in such a manner that when mated with said support structure, said split section is split in a radial direction.

44. The closure of claim 39 wherein at least one end of said tubular member is sealed.

45. The closure of claim 39 wherein said support structure has opposed surfaces which are not parallel.

46. The closure of claim 39 wherein the first and second surface of said support structure and said sections appear V-shaped when viewed in cross-section.

47. The closure of claim 44 wherein at least one of said end sections is solid.

48. The closure of claim 44 wherein at least one of said end sections containing an aperture contains at least one other aperture which is located entirely within the periphery of the section.

49. The closure of claim 44 wherein at least one of said end sections containing an aperture is entirely split through the aperture.

50. The closure of claim 49 wherein said split section is split in such a manner that when mated with said support structure, said split section is split in a radial direction.

51. The closure of claim 44 wherein said support structure has opposed surfaces which are not parallel.

52. The closure of claim 44 wherein the first and second surfaces of said support structure and said sections appear V-shaped when viewed in cross section.

53. A closure comprising:
   a closure body having at least one segmented end seal wherein said segmented end seal comprises:
   a support structure comprising a central solid portion and a plurality of legs emanating from the central portion, wherein the distal end of each of the legs comprises a segment of the periphery of the assembled segmented end seal;
   at least two pie shaped end sections sized and configured for mating with said support structure in that each leg of said support structure has a first surface and an adjacent leg has a second surface for abutting complimentary first and second surfaces, respectively, of each of said end sections, each of said sections having a portion of its periphery which comprises a segment of the periphery of the assembled segmented end seal so that when said sections and said support structure are mated together, said assembled segmented end seal has a uniform periphery;
   wherein the first and second surfaces of said support structure and said sections appear V-shaped when viewed in cross section;
   wherein at least one of said sections contains an aperture for receiving a cable, the aperture being located entirely within the periphery of said section; and
   wherein the assembled and segmented end seal is configured such that:
      (a) the central portion of said support structure is positioned so as to be the center of said end seal;
      (b) each pie shaped end section may be removed without disturbing any other end section; and
      (c) each pie shaped end section is seated in said support structure by the first and second surfaces of said support structure.

54. The closure according to claim 53 wherein at least one of said end sections is solid.

55. The closure of claim 53 wherein at least one of said end sections containing an aperture contains at least one other aperture which is located entirely within the periphery of said section.

56. The closure of claim 53 wherein at least one of said end sections containing an aperture is entirely split through the aperture.

57. The closure of claim 56 wherein said split section is split in such a manner that when mated with said support structure, said split section is split in a radial direction.

58. The closure of claim 53 wherein at least on of said end sections containing an aperture includes a tubular member aligned with the aperture and projection from a surface of said section.

59. The closure of claim 58 wherein one of said tubular member is sealed.

60. The closure of claim 53 wherein said support structure has opposed surfaces which are not parallel.

61. A segmented end seal comprising:
   a support structure comprising a central solid portion and a plurality of legs emanating from the central portion wherein the distal end of each of the legs comprises a segment of the periphery of the assembled segmented end seal;
   at least two pie shaped end sections sized and configured for mating with said support structure in that each leg of support structure has a first surface and an adjacent leg has a second surface for abutting complementary first and second surfaces, respectively, of each of said end sections, each of said sections having a portion of its periphery which comprises a minor arc segment of the periphery of the assembled segmented end seal and each of said sections are one piece across the sections periphery which forms a part of the periphery of the assembled segmented end seal so that when said sections and said support structure are mated together, said assembled segmented end seal has a uniform periphery circumferentially around a side edge formed by the thickness of the distal ends and the at least two pie shaped end sections and transversely across the thickness of the distal ends and the at least two pie shaped end sections,
   wherein at least one of said sections contains an aperture for receiving a cable, the aperture being located entirely within the periphery of said section; and
   wherein the assembled segmented end seal is configured such that:
      (a) the central portion of said support structure is positioned so as to be the center of said end seal;
      (b) each pie shaped end section may be removed without disturbing any other end section;
      (c) each pie shaped end section is seated in said support structure by the first and second surfaces of said support structure; and
      (d) at least one distal end of the leg abutts a support bar.

62. A closure comprising:
   a closure body having at least one segmented end seal wherein said segmented end seal comprises:
   a support structure comprising a central solid portion and a plurality of legs emanating from the central portion; wherein the distal end of each of the legs comprises a segment of the periphery of the assembled segmented end seal;
   at least two pie shaped end sections sized and configured for mating with said support structure in that each leg of said support structure has a first surface and an adjacent leg has a second surface for abutting complementary first and second surfaces, respectively, of each of said end sections, each of said sections having a portion of its periphery which comprises a minor arc segment of the periphery of the assembled segmented end seal and each of said sections are one piece across the sections periphery which forms a part of the periphery of the assembled segmented end seal so that when said sections and said support structure are mated together, said assembled segmented end seal has a uniform periphery circumferentially around a side formed by the thickness of the distal ends and the at least two pie shaped end sections and transversely across the thickness of the distal ends and the at least two pie shaped end sections;
   wherein at least one of said sections contains an aperture for receiving a cable, the aperture being located entirely within the periphery of said section; and
   wherein the assembled segmented end seal is configured such that:

(a) the central portion of said support structure is positioned so as to be the center of said end seal;

(b) each pie shaped end section may be removed without disturbing any other end section; and (c) each pie shaped end section is seated in said support structure by the first and second surfaces of said support structure; and (d) at least one distal end of the leg abutts a support bar, the support bar capable of spacing apart end seals.

63. A segmented end seal comprising:

a support structure comprising a central solid portion and a plurality of legs emanating from the central portion wherein the distal end of each of the legs comprises a segment of the periphery of the assembled segmented end seal;

at least two pie shaped end sections sized and configured for mating with said support structure in that each leg of support structure has a first surface and an adjacent leg has a second surface for abutting complementary first and second surfaces, respectively, of each of said end sections, each of said sections having a portion of its periphery which comprises a segment of the periphery of the assembled segmented end seal so that when said sections and said support structure are mated together, said assembled segmented end seal has a uniform periphery, wherein at least one of said sections contains an aperture for receiving a cable, the aperture being located entirely within the periphery of said section and wherein at least one of said sections containing an aperture contains at least one other aperture which is located entirely within the periphery of said section; and wherein the assembled segmented end seal is configured such that:

(a) the central portion of said support structure is positioned so as to be the center of said end seal;

(b) each pie shaped end section may be removed without disturbing any other end section; and (c) each pie shaped end section is seated in said support structure by the first and second surfaces of said support structure.

64. A segmented end seal comprising:

a support structure comprising a central solid portion and a plurality of legs emanating from the central portion wherein the distal end of each of the legs comprises a segment of the periphery of the assembled segmented end seal;

at least two pie shaped end sections sized and configured for mating with said support structure in that each leg of support structure has a first surface and an adjacent leg has a second surface for abutting complementary first and second surfaces, respectively, of each of said end sections, each of said sections having a portion of its periphery which comprises a segment of the periphery of the assembled segmented end seal so that when said sections and said support structure are mated together, said assembled segmented end seal has a uniform periphery wherein at least one of said sections contains an aperture for receiving a cable, the aperture being located entirely within the periphery of said section and wherein at least one of said sections containing an aperture is entirely split through the aperture; and wherein the assembled segmented end seal is configured such that:

(a) the central portion of said support structure is positioned so as to be the center of said end seal;

(b) each pie shaped end section may be removed without disturbing any other end section; and (c) each pie shaped end section is seated in said support structure by the first and second surfaces of said support structure.

65. The segmented end seal of claim 64 wherein said split section is split in such a manner that when mated with said support structure, said split section is split in a radial direction.

66. A segmented end seal comprising:

a support structure comprising a central solid portion and a plurality of legs emanating from the central portion wherein the distal end of each of the legs comprises a segment of the periphery of the assembled segmented end seal;

at least two pie shaped end sections sized and configured for mating with said support structure in that each leg of support structure has a first surface and an adjacent leg has a second surface for abutting complementary first and second surfaces, respectively, of each of said end sections, each of said sections having a portion of its periphery which comprises a segment of the periphery of the assembled segmented end seal so that when said sections and said support structure are mated together, said assembled segmented end seal has a uniform periphery, wherein at least one of said sections contains an aperture for receiving a cable, the aperture being located entirely within the periphery of said section and wherein at least one of said sections containing an aperture includes a tubular member aligned with the aperture and projecting from a surface of said section; and wherein the assembled segmented end seal is configured such that:

(a) the central portion of said support structure is positioned so as to be the center of said end seal;

(b) each pie shaped end section may be removed without disturbing any other end section; and (c) each pie shaped end section is seated in said support structure by the first and second surfaces of said support structure.

67. The segmented end seal of claim 66 wherein on end of said tubular member is sealed.

68. A segmented end seal comprising:

a support structure comprising a central solid portion and plurality of legs emanating from the central portion wherein the distal end of each of the legs comprises a segment of the periphery of the assembled segmented end seal;

at least two pie shaped end sections sized and configured for mating with said support structure in that each leg of support structure has a first surface and an adjacent leg has a second surface for abutting complementary first and second surfaces, respectively, of each of said end sections, each of said sections having a portion of its periphery which comprises a segment of the periphery of the assembled segmented end seal so that when said sections and said support structure are mated together, said assembled segmented end seal has a uniform periphery and wherein the first and second surfaces of said support structure and sections appear V-shaped when viewed in cross-section, wherein at least one of said sections contains an aperture for receiving a cable, the aperture being located entirely within the periphery of said section; and wherein the assembled segmented end seal is configured such that:

(a) the central portion of said support structure is positioned so as to be the center of said end seal;
(b) each pie shaped end section may be removed without disturbing any other end section; and
(c) each pie shaped end section is seated in said support structure by the first and second surfaces of said support structure.

69. A closure comprising:
a closure body having at least one segmented end seal wherein said segmented end seal comprises:
a support structure comprising a central solid portion and a plurality of legs emanating from the central portion; wherein the distal end of each of the legs comprises a segment of the periphery of the assembled segmented end seal;
at least two pie shaped end sections sized and configured for mating with said support structure in that each leg of said support structure has a first surface and an adjacent leg has a second surface for abutting complementary first and second surfaces, respectively, of each of said end sections, each of said sections having a portion of its periphery which comprises a segment of the periphery of the assembled segmented end seal so that when said sections and said support structure are mated together, said assembled segmented end seal has a uniform periphery;
wherein at least one of said sections contains an aperture for receiving a cable, the aperture being located entirely within the periphery of said section and wherein at least one of said end sections containing an aperture contains at least one other aperture which is located entirely within the periphery of said section; and
wherein the assembled segmented end seal is configured such that:
(a) the central portion of said support structure is positioned so as to be the center of said end seal;
(b) each pie shaped end section may be removed without disturbing any other end section; and
(c) each pie shaped end section is seated in said support structure by the first and second surfaces of said support structure.

70. A closure comprising:
a closure body having at least one segmented end seal wherein said segmented end seal comprises:
a support structure comprising a central solid portion and a plurality of legs emanating from the central portion; wherein the distal end of each of the legs comprises a segment of the periphery of the assembled segmented end seal;
at least two pie shaped end sections sized and configured for mating with said support structure in that each leg of said support structure has a first surface and an adjacent leg has a second surface for abutting complementary first and second surfaces, respectively, of each of said end sections, each of said sections having a portion of its periphery which comprises a segment of the periphery of the assembled segmented end seal so that when said sections and said support structure are mated together, said assembled segmented end seal has a uniform periphery;
wherein at least one of said sections contains an aperture for receiving a cable, the aperture being located entirely within the periphery of said section and wherein at least one of said end sections containing an aperture is entirely split through the aperture; and
wherein the assembled segmented end seal is configured such that:
(a) the central portion of said support structure is positioned so as to be the center of said end seal;
(b) each pie shaped end section may be removed without disturbing any other end section; and
(c) each pie shaped end section is seated in said support structure by the first and second surfaces of said support structure.

71. The closure of claim 70 wherein said split section is split in such a manner that when mated with said support structure, said split section is split in a radial direction.

72. A closure comprising:
a closure body having at least one segmented end seal wherein said segmented end seal comprises:
a support structure comprising a central solid portion and a plurality of legs emanating from the central portion; wherein the distal end of each of the legs comprises a segment of the periphery of the assembled segmented end seal;
at least two pie shaped end sections sized and configured for mating with said support structure in that each leg of said support structure has a first surface and an adjacent leg has a second surface for abutting complementary first and second surfaces, respectively, of each of said end sections, each of said sections having a portion of its periphery which comprises a segment of the periphery of the assembled segmented end seal so that when said sections and said support structure are mated together, said assembled segmented end seal has a uniform periphery;
wherein at least one of said sections contains an aperture for receiving a cable, the aperture being located entirely within the periphery of said section and wherein at least one of said end sections containing an aperture includes a tubular member aligned with the aperture and projecting from a surface of said section; and
wherein the assembled segmented end seal is configured such that:
(a) the central portion of said support structure is positioned so as to be the center of said end seal;
(b) each pie shaped end section may be removed without disturbing any other end section; and
(c) each pie shaped end section is seated in said support structure by the first and second surfaces of said support structure.

73. The closure of claim 72 wherein one end of said tubular member is sealed.

74. A closure comprising:
a closure body having at least one segmented end seal wherein said segmented end seal comprises:
a support structure comprising a central solid portion and a plurality of legs emanating from the central portion; wherein the distal end of each of the legs comprises a segment of the periphery of the assembled segmented end seal;
at least two pie shaped end sections sized and configured for mating with said support structure in that each leg of said support structure has a first surface and an adjacent leg has a second surface for abutting complementary first and second surfaces, respectively, of each of said end sections, each of said sections having a portion of its periphery which comprises a segment of the periphery of the assembled segmented end seal so that when said sections and said support structure are mated together, said assembled segmented end seal has a uniform periphery and wherein the first and second surfaces of said support structure and said sections appear V-shaped when viewed in cross-section;

wherein at least one of said sections contains an aperture for receiving a cable, the aperture located entirely within the periphery of said section; and wherein the assembled segmented end seal is configured such that:
(a) the central portion of said support structure is positioned so as to be the center of said end seal;
(b) each pie shaped end section may be removed without disturbing any other end section; and
(c) each pie shaped end section is seated in said support structure by the first and second surfaces of said support structure.

75. The segmented end seal of claims 61, 63, 64, 65, 66, 67 or 68 having a plurality of legs which taper inwardly from the periphery and the segmented end seal contains an end section for each leg.

76. The closure of claims 62, 69, 70, 71, 72, 73 or 74 having a plurality of legs which taper inwardly from the periphery and the segmented end seal contains an end section for each leg, the closure body includes two end seals which fit within opposing ends of a tubular closure body, the closure body formed from opposing half tubular members joined along opposing longitudinal seams and in which the body surrounds and forms a seal with the periphery of end seals.

77. A segmented end seal comprising:
a support structure comprising a central solid portion and a plurality of legs emanating from the central portion wherein the distal end of each of the legs comprises a segment of the periphery of the assembled segmented end seal;
at least two pie shaped end sections sized and configured for mating with said support structures in that each leg of support structure has a first surface and an adjacent leg has a second surface for abutting complementary first and second surfaces, respectively, of each of said end sections, each of said sections having a portion of its periphery which comprises a minor arc segment of the periphery of the assembled segmented end seal and each of said sections are one piece across the sections periphery which forms a part of the periphery of the assembled segmented end seal so that when said sections and said support structure are mated together, said assembled segmented end seal has a uniform periphery circumferentially and transversely,
wherein at least one of said sections contains an aperture for receiving a cable, the aperture being located entirely within the periphery of said section;
wherein at least one of said sections containing an aperture contains at least one other aperture which is located entirely within the periphery of said section; and
wherein the assembled segmented end seal is configured such that:
(a) the central portion of said support structure is positioned so as to be the center of said end seal;
(b) each pie shaped end section may be removed without disturbing any other end section; and
(c) each pie shaped end sectioin is seated in said support structure by the first and second surfaces of said support structure.

78. A segmented end seal comprising:
a support structure comprising a central solid portion and plurality of legs emanating from the central portion wherein the distal end of each of the legs comprises a segment of the periphery of the assembled segmented end seal;
at least two pie shaped end sections sized and configured for mating with said support structure in that each leg of support structure has a first surface and an adjacent leg has a second surface for abutting complementary first and second surfaces, respectively, of each of said end sections, each of said sections having a portion of its periphery which comprises a segment of the periphery of the assembled segmented end seal and each of said sections are one piece across the sections periphery which forms a part of the periphery of the assembled segmented end seal so that when said sections and said support structure are mated together, said assembled segmented end seal has a uniform periphery circumferentially and transversely,
wherein at least one of said sections contains an aperture for receiving a cable, the aperture being located entirely within the periphery of said section;
wherein at least one of said sections containing an aperture is entirely split through the aperture; and
wherein the assembled segmented end seal is configured such that:
(a) the central portion of said support structure is positioned so as to be the center of said end seal;
(b) each pie shaped end section may be removed without disturbing any other end section; and
(c) each pie shaped end section is seated in said support structure by the first and second surfaces of said support structure.

79. A segmented end seal comprising:
a support structure comprising a central solid portion and plurality of legs emanating from the central portion wherein the distal end of each of the legs comprises a segment of the periphery of the assembled segmented end seal;
at least two pie shaped end sections sized and configured for mating with said support structure in that each leg of support structure has a first surface and an adjacent leg has a second surface for abutting complementary first and second surfaces, respectively, of each of said end sections, each of said sections having a portion of its periphery which comprises a segment of the periphery of the assembled segmented end seal and each of said sections are one piece across the sections periphery which forms a part of the periphery of the assembled segmented end seal so that when said sections and said support structure are mated together, said assembled segmented end seal has a uniform periphery circumferentially and transversely,
wherein at least one of said sections contains an aperture for receiving a cable, the aperture being located entirely within the periphery of said section;
wherein at least one of said sections containing an aperture is entirely split through the aperture in such a manner that when mated with said support structure, said split section is split in a radial direction; and
wherein the assembled segmented end seal is configured such that:
(a) the central portion of said support structure is positioned so as to be the center of said end seal;
(b) each pie shaped end section may be removed without disturbing any other end section; and
(c) each pie shaped end section is seated in said support structure by the first and second surfaces of said support structure.

80. A segmented end seal comprising:
a support structure comprising a central solid portion and plurality of legs emanating from the central portion wherein the distal end of each of the legs com-

*prises a segment of the periphery of the assembled segmented end seal;*

*at least two pie shaped end sections sized and configured for mating with said support structure in that each leg of support structure has a first surface and an adjacent leg has a second surface for abutting complementary first and second surfaces, respectively, of each of said end sections, each of said sections having a portion of its periphery which comprises a segment of the periphery of the assembled segmented end seal and each of said sections are one piece across the sections periphery which forms a part of the periphery of the assembled segmented end seal so that when said sections and said support structure are mated together, said assembled segmented end seal has a uniform periphery circumferentially and transversely,*

*wherein at least one of said sections contains an aperture for receiving a cable, the aperture being located entirely within the periphery of said section;*

*wherein at least one of said sections containing an aperture includes a tubular member aligned with the aperture and projecting from a surface of said section; and*

*wherein the assembled segmented end seal is configured such that:*
 *(a) the central portion of said support structure is positioned so as to be the center of said end seal;*
 *(b) each pie shaped end section may be removed without disturbing any other end section; and*
 *(c) each pie shaped end section is seated in said support structure by the first and second surfaces of said support structure.*

*81. A segmented end seal comprising:*

*a support structure comprising a central solid portion and plurality of legs emanating from the central portion wherein the distal end of each of the legs comprises a segment of the periphery of the assembled segmented end seal;*

*at least two pie shaped end sections sized and configured for mating with said support structure in that each leg of support structure has a first surface and an adjacent leg has a second surface for abutting complementary first and second surfaces, respectively, of each of said end sections, each of said sections having a portion of its periphery which comprises a segment of the periphery of the assembled segmented end seal and each of said sections are one piece across the sections periphery which forms a part of the periphery of the assembled segmented end seal so that when said sections and said support structure are mated together, said assembled segmented end seal has a uniform periphery circumferentially and transversely,*

*wherein at least one of said sections contains an aperture for receiving a cable, the aperture being located entirely within the periphery of said section;*

*wherein at least one of said sections containing an aperture includes a tubular member aligned with the aperture and projecting from a surface of said section, said tubular member is sealed; and*

*wherein the assembled segmented end seal is configured such that:*
 *(a) the central portion of said support structure is positioned so as to be the center of said end seal;*
 *(b) each pie shaped end section may be removed without disturbing any other end section; and*
 *(c) each pie shaped end section is seated in said support structure by the first and second surfaces of said support structure.*

*82. A segmented end seal comprising:*

*a support structure comprising a central solid portion and plurality of legs emanating from the central portion wherein the distal end of each of the legs comprises a segment of the periphery of the assembled segmented end seal;*

*at least two pie shaped end sections sized and configured for mating with said support structure in that each leg of support structure has a first surface and an adjacent leg has a second surface for abutting complementary first and second surfaces, respectively, of each of said end sections, each of said sections having a portion of its periphery which comprises a segment of the periphery of the assembled segmented end seal and each of said sections are one piece across the sections periphery which forms a part of the periphery of the assembled segmented end seal so that when said sections and said support structure are mated together, said assembled segmented end seal has a uniform periphery circumferentially and transversely,*

*wherein at least one of said sections contains an aperture for receiving a cable, the aperture being located entirely within the periphery of said section;*

*wherein the first and second surfaces of said support structure and said sections appear V-shaped when viewed in cross-section; and*

*wherein the assembled segmented end seal is configured such that:*
 *(a) the central portion of said support structure is positioned so as to be the center of said end seal;*
 *(b) each pie shaped end section may be removed without disturbing any other end section; and*
 *(c) each pie shaped end section is seated in said support structure by the first and second surfaces of said support structure.*

*83. A closure comprising:*

*a closure body having at least one segmented end seal wherein said segmented end seal comprises:*

*a support structure comprising a central solid portion and a plurality of legs emanating from the central portion; wherein the distal end of each of the legs comprises a segment of the periphery of the assembled segmented end seal;*

*at least two pie shaped end section sized and configured for mating with said support structure in that each leg of said support structure has a first surface and an adjacent leg has a second surface for abutting complementary first and second surfaces, respectively, of each of said end sections, each of said sections having a portion of its periphery which comprises a minor arc segment of the periphery of the assembled segmented end seal and each of said sections are one piece across the sections periphery which forms a part of the periphery of the assembled segmented end seal so that when said sections and said support structure are mated together, said assembled segmented end seal has a uniform periphery circumferentially and transversely;*

*wherein at least one of said sections contains an aperture for receiving a cable, the aperture being located entirely within the periphery of said section;*

*wherein at least one of said end sections containing an aperture contains at least one other aperture which is located entirely within the periphery of said section; and*

*wherein the assembled segmented end seal is configured such that:*

(a) the central portion of said support structure is positioned so as to be the center of said end seal;
(b) each pie shaped end section may be removed without disturbing any other end section; and
(c) each pie shaped end section is seated in said support structure by the first and second surfaces of said support structure.

84. A closure comprising:
a closure body having at least one segmented end seal wherein said segmented end seal comprises:
a support structure comprising a cental solid portion and a plurality of legs emanating from the central portion; wherein the distal end of each of the legs comprises a segment of the periphery of the assembled segmented end seal;
at least two pie shaped end sections sized and configured for mating with said support structure in that each leg of said support structure has a first surface and an adjacent leg has a second surface for abutting complementary first and second surfaces, respectively, of each of said end sections, each of said sections having a portion of its periphery which comprises a minor arc segment of the periphery of the assembled segmented end seal and each of said sections are one piece across the sections periphery which forms a part of the periphery of the assembled segmented end seal so that when said sections and said support structure are mated together, said assembled segmented end seal has a uniform periphery circumferentially and transversely;
wherein at least one of said sections contains an aperture for receiving a cable, the aperture being located entirely within the periphery of said section;
wherein at least one of said end sections containing an aperture is split entirely through the aperture; and
wherein the assembled segmented end seal is configured such that:
(a) the central portion of said support structure is positioned so as to be the center of said end seal;
(b) each pie shaped end section may be removed without disturbing any other end section; and
(c) each pie shaped end section is seated in said support structure by the first and second surfaces of said support structure.

85. A closure comprising:
a closure body having at least one segmented end seal wherein said segmented end seal comprises:
a support structure comprising a central solid portion and a plurality of legs emanating from the central portion; wherein the distal end of each of the legs comprises a segment of the periphery of the assembled segmented end seal;
at least two pie shaped end sections sized and configured for mating with said support structure in that each leg of said support structure has a first surface and an adjacent leg has a second surface for abutting complementary first and second surfaces, respectively, of each of said end sections, each of said sections having a portion of its periphery which comprises a minor arc segment of the periphery of the assembled segmented end seal and each of said sections are one piece across the sections periphery which forms a part of the periphery of the assembled segmented end seal so that when said sections and said support structure are mated together, said assembled segmented end seal has a uniform periphery circumferentially and transversely;
wherein at least one of said sections contains an aperture for receiving a cable, the aperture being located entirely within the periphery of said section;
wherein at least one of said end sections containing an aperture is entirely split through the aperture in such a manner that when mated with said support structure, said split section is split in a radial direction; and
wherein the assembled segmented end seal is configured such that:
(a) the central portion of said support structure is positioned so as to be the center of said end seal;
(b) each pie shaped end section may be removed without disturbing any other end section; and
(c) each pie shaped end section is seated in said support structure by the first and second surfaces of said support structure.

86. A closure comprising:
a closure body having at least one segmented end seal wherein said segmented end seal comprises:
a support structure comprising a central solid portion and a plurality of legs emanating from the central portion; wherein the distal end of each of the legs comprises a segment of the periphery of the assembled segmented end seal;
at least two pie shaped sections sized and configured for mating with said support structure in that each leg of said support structure has a first surface and an adjacent leg has a second surface for abutting complementary first and second surfaces, respectively, of each of said end sections, each of said sections having a portion of its periphery which comprises a minor arc segment of the periphery of the assembled segmented end seal and each of said sections are one piece across the sections periphery which forms a part of the periphery of the assembled segmented end seal so that when said sections and said support structure are mated together, said assembled segmented end seal has a uniform periphery circumferentially and transversely;
wherein at least one of said sections contains an aperture for receiving a cable, the aperture being located entirely within the periphery of said section;
wherein at least one of said end sections containing an aperture includes a tubular member aligned with the aperture and projecting from a surface of said section; and
wherein the assembled segmented end seal is configured such that:
(a) the central portion of said support structure is positioned so as to be the center of said end seal;
(b) each pie shaped end section may be removed without disturbing any other end section; and
(b) each pie shaped end section is seated in said support structure by the first and second surfaces of said support structure.

87. A closure comprising:
a closure body having at least one segmented end seal wherein said segmented end seal comprises:
a support structure comprising a central solid portion and a plurality of legs emanating from the central portion; wherein the distal end of each of the legs comprises a segment of the periphery of the assembled segmented end seal;
at least two pie shaped end sections sized and configured for mating with said support structure in that each leg of said support structure has a first surface and an adjacent leg has a second surface for abutting complementary first and second surfaces, respectively, of each of said end sections, each of said sections having a portion of its periphery which comprises a minor arc segment of the periphery of the assembled segmented end seal and each of said sections are one piece across the sections periphery which forms a part of the periphery of the assembled segmented end seal so that when said sections and said support structure are mated together, said assembled segmented end seal has a uniform periphery circumferentially and transversely;

wherein at least one of said sections contains an aperture for receiving a cable, the aperture being located entirely within the periphery of said section;

wherein at least one of said end sections containing an aperture includes a tubular member aligned with the aperture and projecting from a surface of said section, one end of said tubular member is sealed; and wherein the assembled segmented end seal is configured such that:
(a) the central portion of said support structure is positioned so as to be the center of said end seal;
(b) each pie shaped end section may be removed without disturbing any other end section; and
(c) each pie shaped end section is seated in said support structure by the first and second surfaces of said support structure.

88. A closure comprising:

a closure body having at least one segmented end seal wherein said segmented end seal comprises:

a support structure comprising a central solid portion and a plurality of legs emanating from the central portion; wherein the distal end of each of the legs comprises a segment of the periphery of the assembled segmented end seal;

at least two pie shaped end sections sized and configured for mating with said support structure in that each leg of said support structure has a first surface and an adjacent leg has a second surface for abutting complementary first and second surfaces, respectively, of each of said end sections, each of said sections having a portion of its periphery which comprises a minor arc segment of the periphery of the assembled segmented end seal and each of said sections are one piece across the sections periphery which forms a part of the periphery of the assembled segmented end seal so that when said sections and said support structure are mated together, said assembled segmented end seal has a uniform periphery circumferentially and transversely;

wherein at least one of said sections contains an aperture for receiving a cable, the aperture being located entirely within the periphery of said section;

wherein the first and second surfaces of said support structure and said sections appear V-shaped when viewed in cross-section; and wherein the assembled segmented end seal is configured such that:
(a) the central portion of said support structure is positioned so as to be the center of said end seal;
(b) each pie shaped end section may be removed without disturbing any other end section; and
(c) each pie shaped end section is seated in said support structure by the first and second surfaces of said support structure.

89. The segmented end seal of claim 61 wherein at least one of said sections is solid.

90. The segmented end seal of claim 61 wherein at least one of said sections containing an aperture contains at least one other aperture which is located entirely within the periphery of said section.

91. The segmented end seal of claim 61 wherein at least one of said sections containing an aperture is entirely split through the aperture.

92. The segmented end seal of claim 91 wherein said split section is split in such a manner that when mated with said support structure, said split section is split in a radial direction.

93. The segmented end seal of claim 61 wherein at least one of said sections containing an aperture includes a tubular member aligned with the aperture and projecting from a surface of said section.

94. The segmented end seal of claim 93 wherein one end of said tubular member is sealed.

95. The segmented end seal of claim 61 wherein said support structure has opposed surfaces which are not parallel.

96. The segmented end seal of claim 61 wherein the first and second surfaces of said support structure and said sections appear V-shaped when viewed in cross-section.

97. The closure of claim 62 wherein at least one of said end sections is solid.

98. The closure of claim 62 wherein at least one of said end sections containing an aperture contains at least one other aperture which is located entirely within the periphery of said section.

99. The closure of claim 62 wherein at least one of said end sections containing an aperture is entirely split through the aperture.

100. The closure of claim 99 wherein said split section is split in such a manner that when mated with said support structure, said split section is split in a radial direction.

101. The closure of claim 62 wherein at least one of said end sections containing an aperture includes a tubular member aligned with the aperture and projecting from a surface or said section.

102. The closure of claim 101 wherein one end of said tubular member is sealed.

103. The closure of claim 62 wherein said support structure has opposed surfaces which are not parallel.

104. The closure of claim 62 wherein the first and second surfaces of said support structure and said sections appear V-shaped when viewed in cross-section.

* * * * *